United States Patent
Tollefsrud et al.

(10) Patent No.: US 11,259,456 B2
(45) Date of Patent: Mar. 1, 2022

(54) APPLICATOR WITH MULTIPLE OFFSET BOOMS AND METHOD OF CONTROLLING THE SAME

(71) Applicant: CNH Industrial America LLC, New Holland, PA (US)

(72) Inventors: Aaron Robert Tollefsrud, Willmar, MN (US); Sunil Vetal, Westmont, IL (US); Rex LeRoy Ruppert, Benson, MN (US); Lyle Mangen, Willmar, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 16/736,259

(22) Filed: Jan. 7, 2020

(65) Prior Publication Data
US 2021/0204470 A1  Jul. 8, 2021

(51) Int. Cl.
*A01C 7/08* (2006.01)
*A01C 7/10* (2006.01)
(Continued)

(52) U.S. Cl.
CPC .............. *A01C 7/082* (2013.01); *A01C 7/102* (2013.01); *A01C 15/04* (2013.01); *A01M 9/003* (2013.01); *B05B 1/1681* (2013.01); *G05D 7/0605* (2013.01)

(58) Field of Classification Search
CPC .... B65G 53/10; B65G 53/4608; B65G 53/50; B65G 53/66; B65G 69/06; B65G 69/0491;
(Continued)

(56) References Cited

U.S. PATENT DOCUMENTS

| 4,162,689 A * | 7/1979 | Zdrodowski | .......... G01F 13/006 |
| | | | 137/266 |
| 5,361,796 A * | 11/1994 | Mutter | ................ F16K 11/0743 |
| | | | 137/14 |

(Continued)

FOREIGN PATENT DOCUMENTS

WO    2009036575 A1    3/2009

OTHER PUBLICATIONS www.Blog.MachineFinder.com—How Can the John Deere 4630 Sprayer Help You On the Job?—https://blog.machinefinder.com/22516/can-john-deere-4630-sprayer-help-job (Jul. 29, 2015).

*Primary Examiner* — Joseph A Dillon, Jr.
(74) *Attorney, Agent, or Firm* — Rebecca L. Henkel; Rickard K. DeMille (57) ABSTRACT

An agricultural product delivery applicator for delivering particulate product to a field. The applicator includes a supply compartment to hold the product, a pneumatic conveying system, a metering system, and a controller. The pneumatic conveying system includes first delivery line operably connected to an airflow source and to the supply compartment, and a second delivery line operably connected to the airflow source and to the supply compartment. The metering system includes a first metering device associated with the first delivery line and a second metering device associate with the second delivery line. The controller controls the air flow source, the first metering device to meter product to result in a first mixed flow of airflow and product for the first delivery line, and the second metering device to meter product with the airflow to result in a second mixed flow of airflow and product for the second delivery line.

12 Claims, 10 Drawing Sheets

(51) Int. Cl.
    *G05D 7/06* (2006.01)
    *A01C 15/04* (2006.01)
    *B05B 1/16* (2006.01)
    *A01M 9/00* (2006.01)

(58) Field of Classification Search
    CPC .......... B65G 2201/04; B65G 2201/042; B65G 2812/16; B65G 2812/1616; B60P 1/60; B60P 1/62; B05B 1/1681; A01M 9/003; Y10T 137/4857; Y10T 137/4874; Y10T 137/4807; A01C 7/081; A01C 7/082; A01C 7/083; A01C 7/084; A01C 15/04; A01C 17/008; A01C 21/00
    USPC ..... 406/10, 14, 39, 127, 128, 129, 130, 131, 406/132, 133, 144, 197; 111/174, 175; 137/255, 262, 266, 267
    See application file for complete search history.

(56) References Cited

U.S. PATENT DOCUMENTS

| | | | |
|---|---|---|---|
| 5,911,362 A | 6/1999 | Wood et al. | |
| 7,373,890 B2 * | 5/2008 | Kowalchuk | A01C 7/082 |
| | | | 111/175 |
| 7,690,440 B2 | 4/2010 | Dean et al. | |
| 9,031,749 B2 * | 5/2015 | Hubalek | A01C 7/102 |
| | | | 701/50 |
| 9,609,803 B2 | 4/2017 | Gervais | |
| 9,795,079 B2 * | 10/2017 | Roberge | A01C 7/122 |
| 9,894,829 B2 | 2/2018 | Shivak | |
| 10,149,427 B2 | 12/2018 | Bourgault et al. | |
| 10,278,326 B2 * | 5/2019 | Roberge | A01C 15/04 |
| 10,687,460 B2 * | 6/2020 | Roberge | B01F 13/0294 |
| 2004/0017281 A1 | 1/2004 | Dix | |
| 2007/0022928 A1 * | 2/2007 | Kowalchuk | A01C 7/082 |
| | | | 111/175 |
| 2012/0316736 A1 * | 12/2012 | Hubalek | A01C 7/102 |
| | | | 701/50 |
| 2015/0271989 A1 * | 10/2015 | Kinch | A01C 7/102 |
| | | | 701/50 |
| 2016/0095274 A1 * | 4/2016 | Wendte | A01C 21/005 |
| | | | 111/177 |
| 2016/0095276 A1 | 4/2016 | Roberge et al. | |
| 2016/0278281 A1 * | 9/2016 | Beck | A01B 59/00 |
| 2018/0007826 A1 * | 1/2018 | Roberge | A01C 7/081 |
| 2018/0042172 A1 * | 2/2018 | Gervais | A01C 15/122 |
| 2018/0153093 A1 * | 6/2018 | Koch | A01C 7/046 |
| 2018/0325021 A1 | 11/2018 | Connell et al. | |
| 2018/0343791 A1 * | 12/2018 | Roberge | A01C 15/04 |
| 2018/0343792 A1 | 12/2018 | Roberge et al. | |
| 2019/0021214 A1 * | 1/2019 | Roberge | B05B 13/005 |
| 2019/0021215 A1 | 1/2019 | Roberge et al. | |
| 2019/0021221 A1 * | 1/2019 | Roberge | B01F 13/0277 |
| 2019/0022608 A1 * | 1/2019 | Roberge | A01C 7/082 |
| 2019/0023504 A1 | 1/2019 | Roberge et al. | |
| 2019/0045772 A1 * | 2/2019 | Roberge | A01C 7/081 |
| 2019/0098827 A1 * | 4/2019 | Gilbert | A01C 7/082 |
| 2019/0200514 A1 * | 7/2019 | Stark | A01C 7/105 |
| 2019/0366280 A1 * | 12/2019 | Roberge | B01F 3/18 |
| 2019/0387664 A1 * | 12/2019 | Roberge | A01C 7/124 |
| 2020/0000014 A1 * | 1/2020 | Roberge | A01C 7/046 |
| 2020/0010286 A1 * | 1/2020 | Roberge | A01C 7/127 |
| 2020/0038820 A1 * | 2/2020 | Roberge | B01F 5/0606 |
| 2020/0359552 A1 * | 11/2020 | Gilbert | A01C 7/084 |
| 2021/0015030 A1 * | 1/2021 | Ruppert | A01C 7/081 |

* cited by examiner

FIG. 10

APPLICATOR WITH MULTIPLE OFFSET BOOMS AND METHOD OF CONTROLLING THE SAME

FIELD OF THE INVENTION

The invention relates generally to an agricultural product delivery applicator for applying particulate material such as seed, fertilizer, herbicide, or insecticide to a field, and more particularly an agricultural product delivery applicator with multiple offset booms and a method of controlling the particulate material to the multiple offset booms.

BACKGROUND OF THE INVENTION

Agricultural product delivery systems are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural application implements that employ an agricultural product delivery applicator are known to have the product supply bin associated with a metering system. The product is metered from the bin into a set of distribution channels for application to the soil. A pneumatic source, such as a fan or blower, provides air to convey and distribute material through the distribution channels. Once the metering of product is done and the mix of air and particulates is in the distribution channels, the product should remain nearly constant and in a diluted phase. US Patent Application Publication No. 2018/0343792 A1, the content of which is incorporated herein by reference, discloses such an exemplary agricultural product delivery system.

An agricultural vehicle, such as disclosed US Patent Application Publication No. 2018/0343792 A1, may have a boom construction with left and right boom arms attached to a mid-implement location. Due to the mid-implement mounting, product may not be dispersed at that center location, directly behind the vehicle. To compensate, a secondary offset boom may be added to account for additional coverage directly behind the vehicle. Prior systems had delivery of the product to the secondary boom in tandem with the primary boom, resulting in either loss in area (if a boom turned "off" too soon when entering a previously applied area) or loss in product (if a boom turned "on" too soon when exiting a previously applied area into uncovered area). An improved method for delivery of product is desired.

BRIEF SUMMARY OF THE INVENTION

In one aspect, the invention provides an agricultural product delivery applicator for delivering particulate product to a field. The applicator includes a supply compartment to hold the product, a pneumatic conveying system, a metering system, and a controller. The pneumatic conveying system includes an airflow source to provide an airflow, a first delivery line operably connected to the airflow source and to the supply compartment, the first delivery line including a first plurality of outlets, and a second delivery line operably connected to the airflow source and to the supply compartment, the second delivery line including a second plurality of outlets. The metering system is operably connected between the supply compartment and the pneumatic conveying system. The metering system includes a first metering device associated with the first delivery line and a second metering device associate with the second delivery line. The controller controls the air flow source, the first metering device to meter product with the airflow to result in a first mixed flow of airflow and product for the first delivery line, and the second metering device to meter product with the airflow to result in a second mixed flow of airflow and product for the second delivery line. The control of the first metering device and the second metering device is individual.

In another aspect, the invention provides a method of the delivering of particulate product by an agricultural product delivery applicator. The method includes activating an airflow source to provide an airflow of a pneumatic conveying system, controlling a first air pressure control valve to allow an airflow through a first delivery line, controlling a second air pressure control valve to allow an airflow through a second delivery line, controlling a first metering device associated with the first delivery line at a first time to provide product to the first delivery line resulting in a first mixed flow of airflow and product, and controlling a second metering device associated with the second delivery line at a second time to provide product to the first delivery line resulting in a second mixed flow of airflow and product. The second time is after the first time.

Numerous additional objects, aspects, and advantages of the present invention will be made apparent from the following detailed description taken together with the drawing figures.

BRIEF DESCRIPTION OF THE DRAWINGS

Preferred exemplary embodiments of the invention are illustrated in the accompanying drawings in which like reference numerals represent like parts throughout. In the drawings.

DETAILED DESCRIPTION OF THE INVENTION

Figure 1:
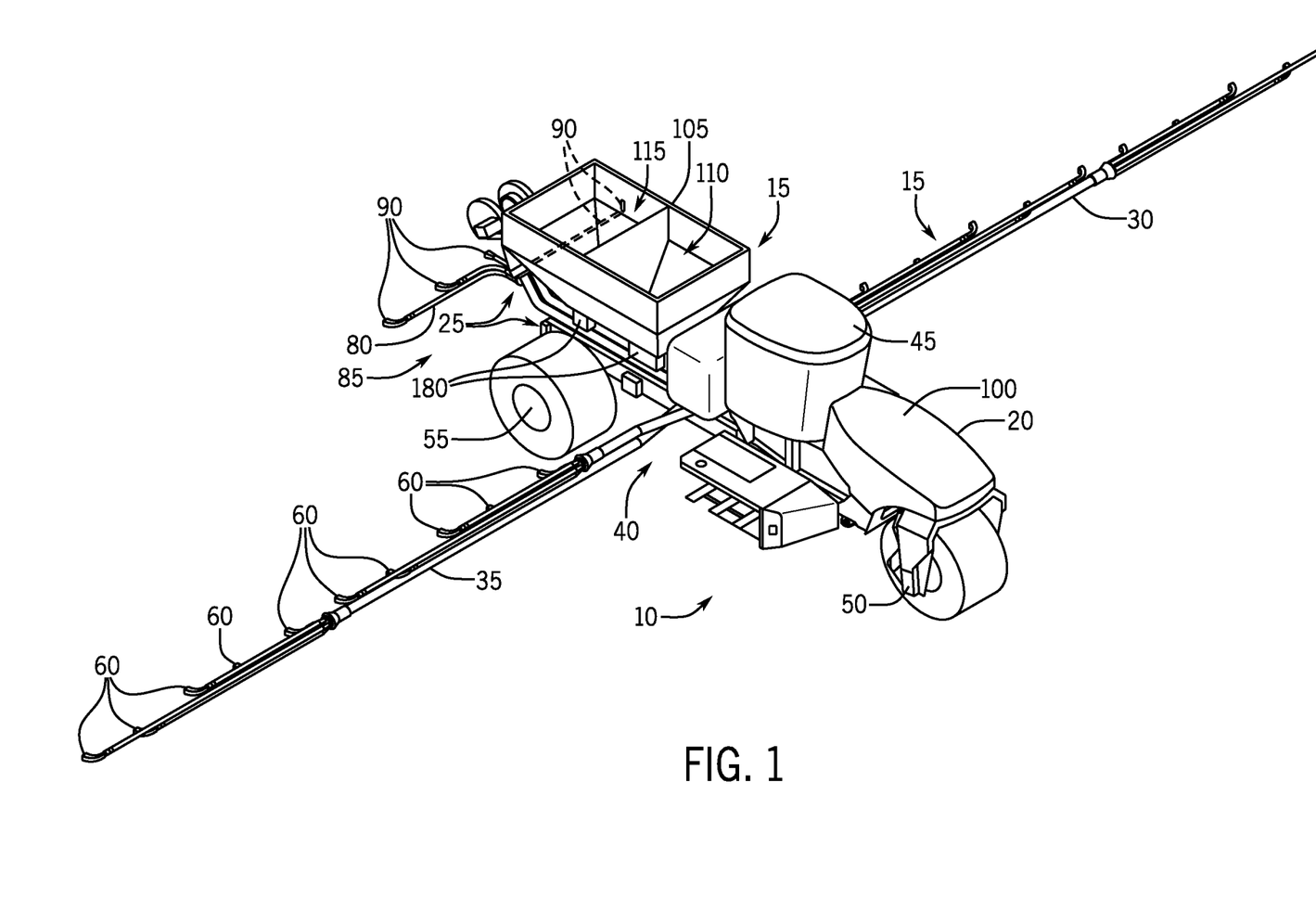
FIG. 1 is an isometric view of an agricultural application implement having a pneumatic conveying system according to one exemplary embodiment of the invention.
Figure 2:
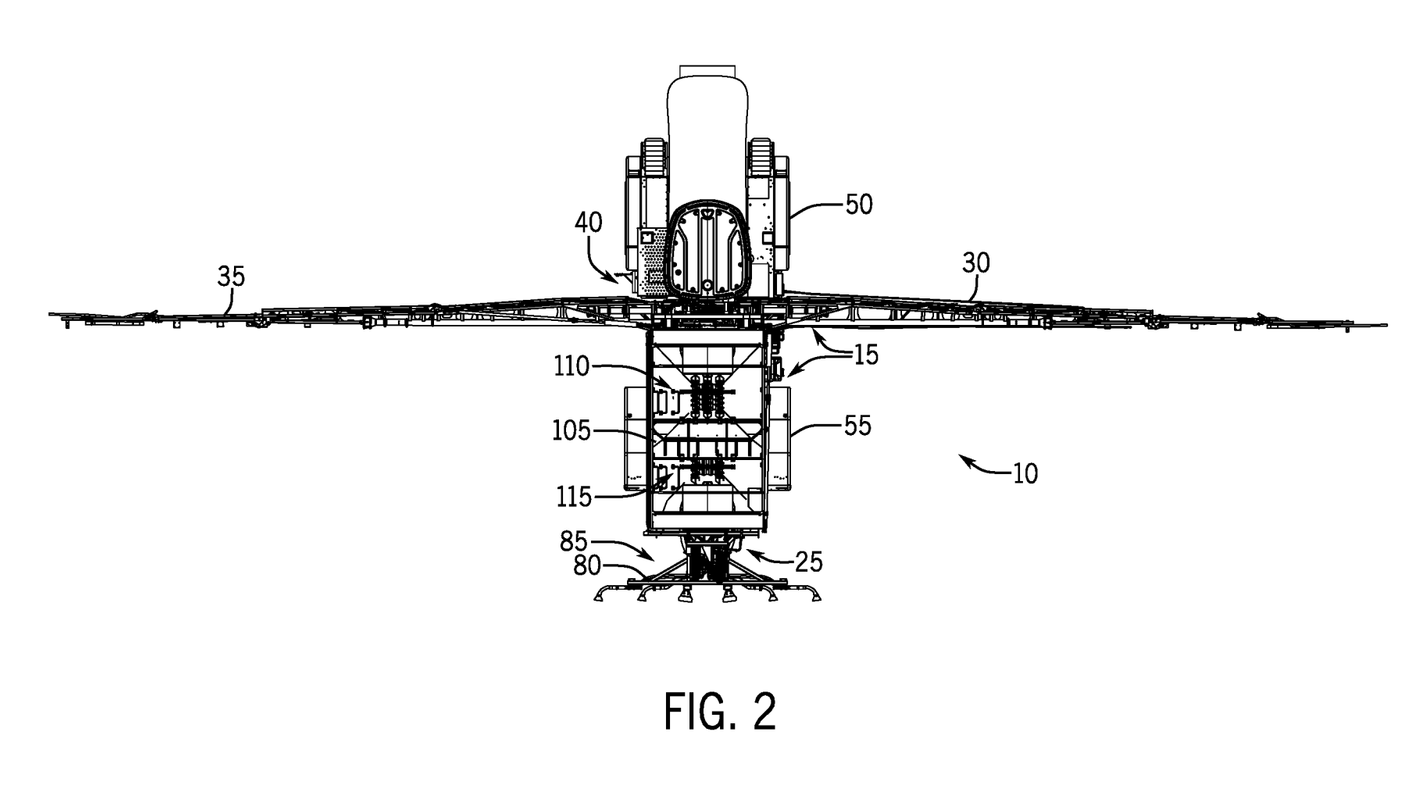
FIG. 2 is a top view of the agricultural application implement of FIG. 1.

An agricultural application implement 10 (or simply implement 10) incorporating aspects of the invention is shown in FIGS. 1 and 2. In the exemplary embodiment shown, the implement 10 includes an agricultural product delivery applicator 15 (or simply applicator 15), which is shown as a granular fertilizer applicator. As is known in the art, the implement 10 generally includes a transport unit 20, such as a truck, tractor, or trailer. The transport unit 20 can be formed integrally with or separately from the applicator 15. The applicator 15 includes a pneumatic conveying system 25 (or simply system 25).

The applicator 15 includes left and right laterally extending booms 30 and 35, respectively, extending at a mid-implement location 40. Left and right are referred to herein as viewed by the operator housed in the operator cab 45. The mid-implement location 40 refers to a mounting of the booms 30 and 35 between the front and rear axles 50 and 55, respectively, of the transport unit 20. The laterally extending booms 30 and 35 include a support structure (not shown for simplicity) and can be pivoted to a stowed position close to the implement 10 for storage or transport. Each boom 30 and 35 includes a plurality of boom conduits or tubes (discussed further below) terminating at respective outboard ends in in the applicator 15. The outboard ends of the booms 30 and 35 include a spreading outlet or nozzle. In the exemplary embodiment shown, boom 35 includes ten outlets 60.

The pneumatic conveying system 25 also includes a laterally extending offset boom 80. The offset boom 80, which may also be referred to as a secondary boom, is mounted at a rearward location 85. The rearward location 85 refers to a mount of the offset boom 80 behind the rear axis 55. The offset boom includes six rear outlets 90. The offset boom 80 in combination with the booms 30 and 35 provide complete coverage across the width of applicator 15.

The shown transport unit 20 is self-propelled by an engine in an engine compartment 100 and includes the operator cab 45. For the shown construction, an uncovered tank 105 includes compartments 110 and 115 for carrying particulate material to be distributed to and disbursed by the outlets 60 and 90. One of the compartments, e.g., compartment 115, can be provided to supply micro-nutrients or other materials. The supply of particulate material in compartments 110 and 115 can be replenished periodically.

Before proceeding, some aspects of the applicator 15 can be a matter of design choice to someone skilled in the art. For example, the number, arrangement, and design of the compartments 110 and 115, delivery lines (discussed below), and outlets 60 and 90 can vary. The applicator 15 is illustrative of the types of equipment on which the pneumatic conveying system 100 can be used; however, it should be understood that the pneumatic conveying system 100 may, of course, be employed in conjunction with other agricultural equipment such as tillage, seeding, or planting devices and is useful in distributing particulate material other than fertilizer.

Figure 3:
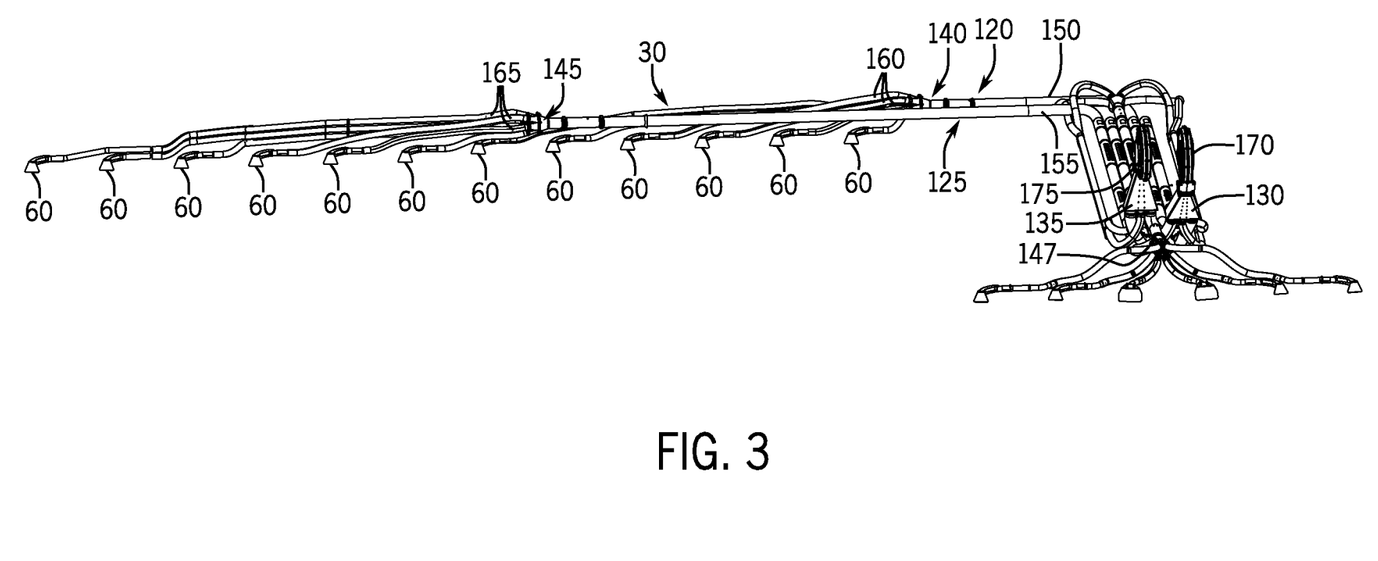
FIG. 3 is a partially broken away isometric view of a portion of the pneumatic conveying system of the implement of FIG. 1.
Figure 4:
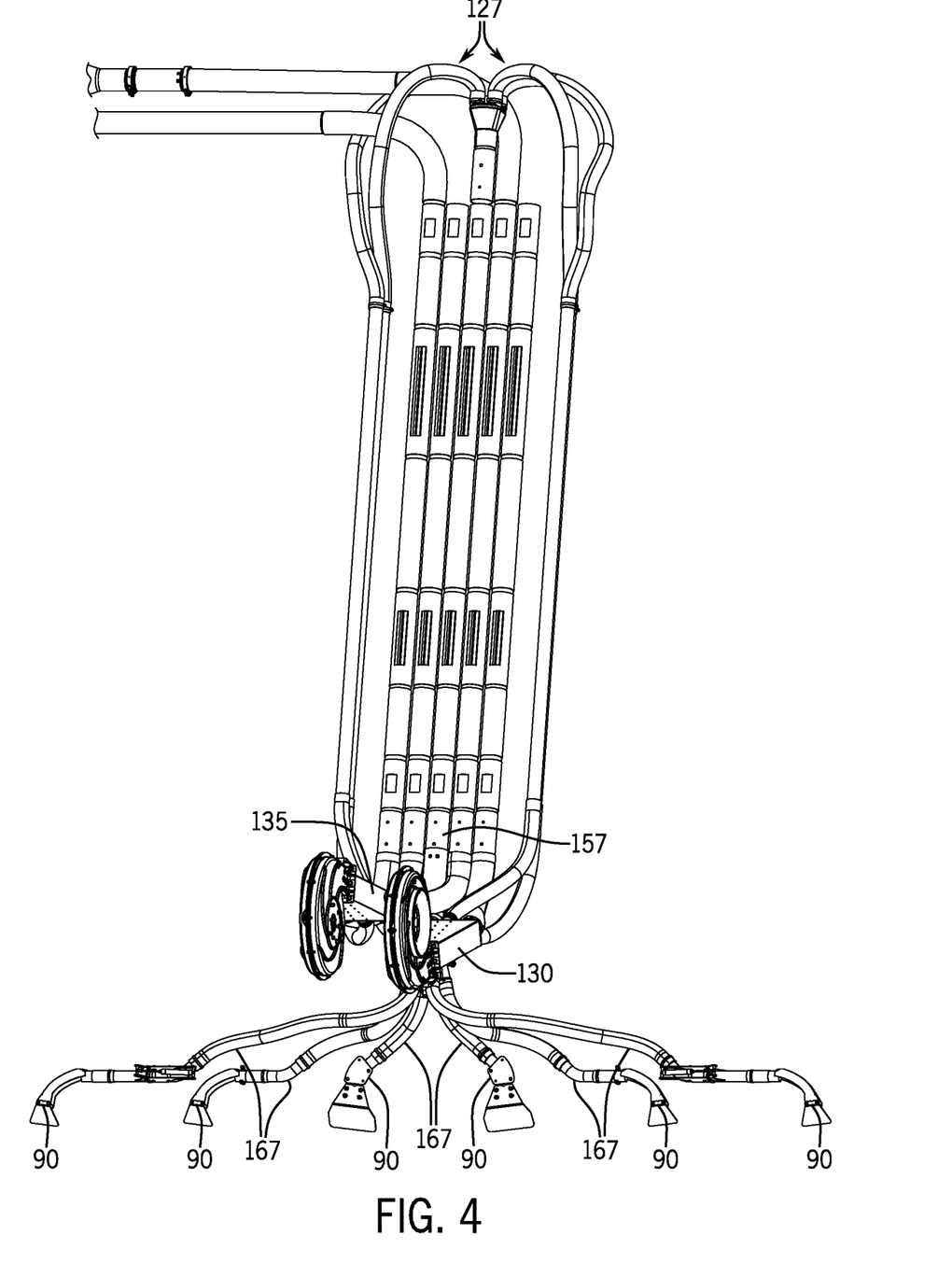
FIG. 4 is a partially broken away isometric view of a second portion of the pneumatic conveying system of the implement of FIG. 1.

The shown construction includes compartments 110 and 115 of the tank 105 being disposed above portions of the pneumatic conveying system 25. FIG. 3 shows a portion of the system 25 delivering to the left laterally extending boom 30. A portion of the pneumatic conveying system 25 delivering to the right laterally extending boom 35 is similar to, but symmetrically opposite from, the portion shown in FIG. 3, and consequently is not shown in detail. FIG. 4 shows a portion of the pneumatic conveying system 25 delivering to the offset boom 80. With reference to FIGS. 3 and 4, the system 25 includes delivery lines 120, 125, and 127 that extend from a plenum 130 and 135 at one end, and terminate at the outlets 60 and 90 at the other end. Through the delivery lines 120, 125, or 127, the fluid and the product are transported therein and are to be split by a distributor assembly 140, 145, or 147. The distributor assembly 140, 145, or 147 divides or distributes a fluid-particulate combination from a supply line 150, 155, or 127 into a number of smaller distribution lines 160, 165, or 167 that are connected to the outlets 60 and 90.

To collect and drive the particulate material along the delivery lines 120, 125 and 127, are one or more pressurized air flow sources. For the shown construction, blowers 170 and 175 are operably connected to the plenums 130 and 135. The air flow from the blowers 170 and 175 is directed from the blowers 170 and 175 into the plenums 130 and 135, then the supply lines 150, 155, and 157, through the distributor assemblies 140, 145, and 147, into the distribution lines 160, 165, and 167, and out the outlets 60 and 90. As the airflow passes through the supply lines 150, 155, and 127, a metering system 180 (FIG. 1) entrains product from the compartments 110 and/or 115 into the airflow. The airflow and entrained product continues to flow along the delivery lines 120, 125, and 127 to the outlets 60 and 90.

Figure 5:
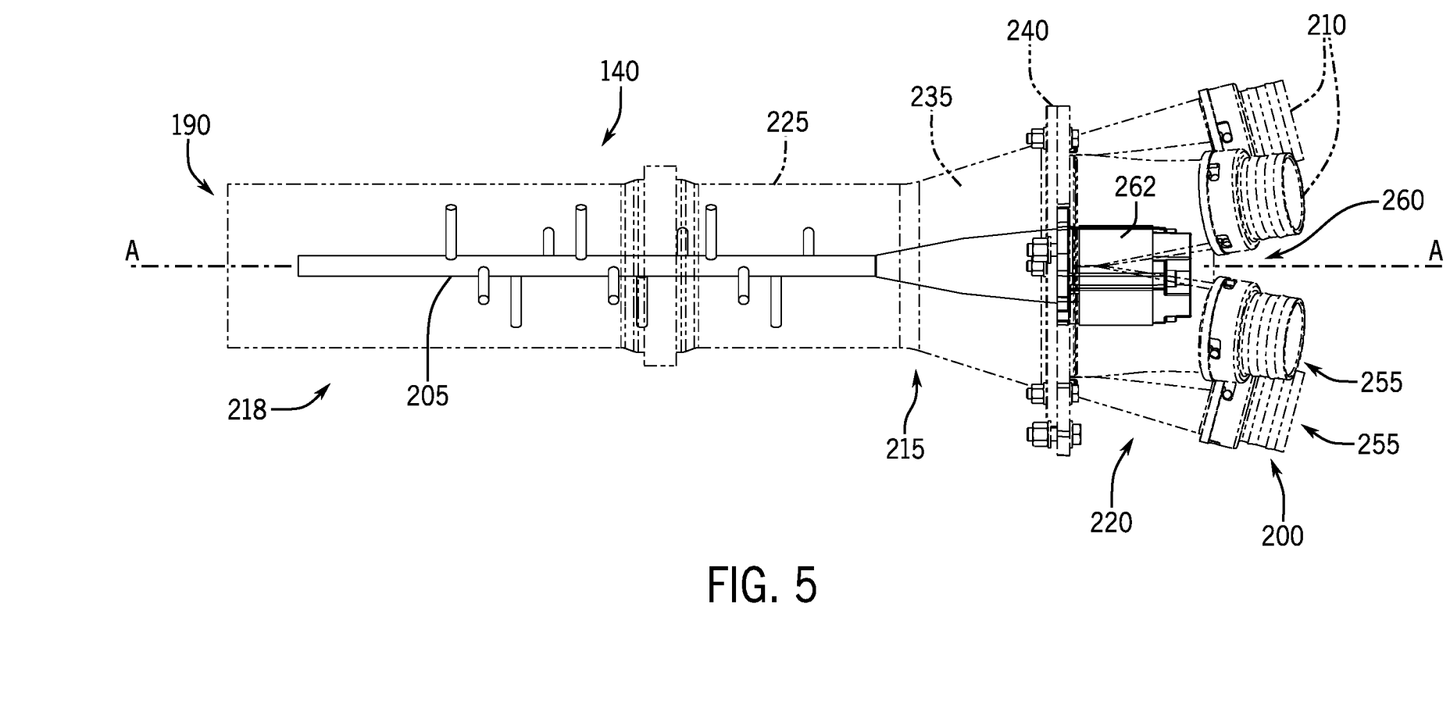
FIG. 5 is a partially broken away cross-sectional view of a rotary distributor assembly of the pneumatic conveying system of FIG. 4.

Referring now to FIG. 5, an exemplary construction of the distributor assembly 140 is illustrated. The supply line 150 (FIG. 3) is connected to one end 190 of the distributor assembly 140 and the distribution lines 160 are each connected to the opposite end 200 of the distributor assembly 140. The generally tubular-shaped housing 205 is oriented in an in-line position with regard to the supply line 150, such that the housing 205 for the distributor assembly 140 is positioned generally horizontal on the boom 30. The generally tubular-shaped housings 210 are oriented in an in-line position with regard to the distribution lines 160.

The distributor assembly 140, as shown in FIG. 5, includes a forward section 215 and a rearward section 220. The forward section 215 includes an elongate portion 225 of the housing 205 that is engaged with the end of the supply line 150 in order to affix the housing 205 to the supply line 150 in a suitable manner. In the illustrated embodiment, the elongate portion 225 has an inner diameter greater than that of the supply line 150 such that the supply line 150 can be inserted within the elongate portion 225 and secured thereto, e.g., with a clamp. The housings 210 includes elongated portions, which engage with the end of the distributor lines 160, 165, or 167 in order to affix the housings 210 to the distributor lines 160, 165, or 167 in a suitable manner; e.g., with clamps.

Opposite the supply line 150, the elongate portion 225 is connected to or integrally formed with a conical portion 235. The conical portion 235 expands radially outwardly from the elongate portion 225 to allow the particulate material entering the conical portion 235 from the elongate portion 225 to move radially outwardly from the center axis A-A of the housing 205. The conical portion 235 is connected to a distributor 240. For the construction shown, the distributor 240 includes the housings 210. The housings 210 surround outlet channels 255. The housings 210 are spaced from one another on the rearward section 220 and extend outwardly at slight angles with regard to the center axis A-A.

The housings 210 surround a space 260 outside the exterior of the distributor 240 in the rearward section. A motor 262 is disposed in the space. The motor 262 can be an electric motor, hydraulic motor, or other suitable type of motor. The motor 262 includes a shaft assembly 205 (or simply "shaft" 205) aligned with or at least positioned parallel to the center axis A-A. Further discussion regarding the distribution assembly can be found in US Patent Application Publication No. 2018/0343792 A1.

Figure 6:
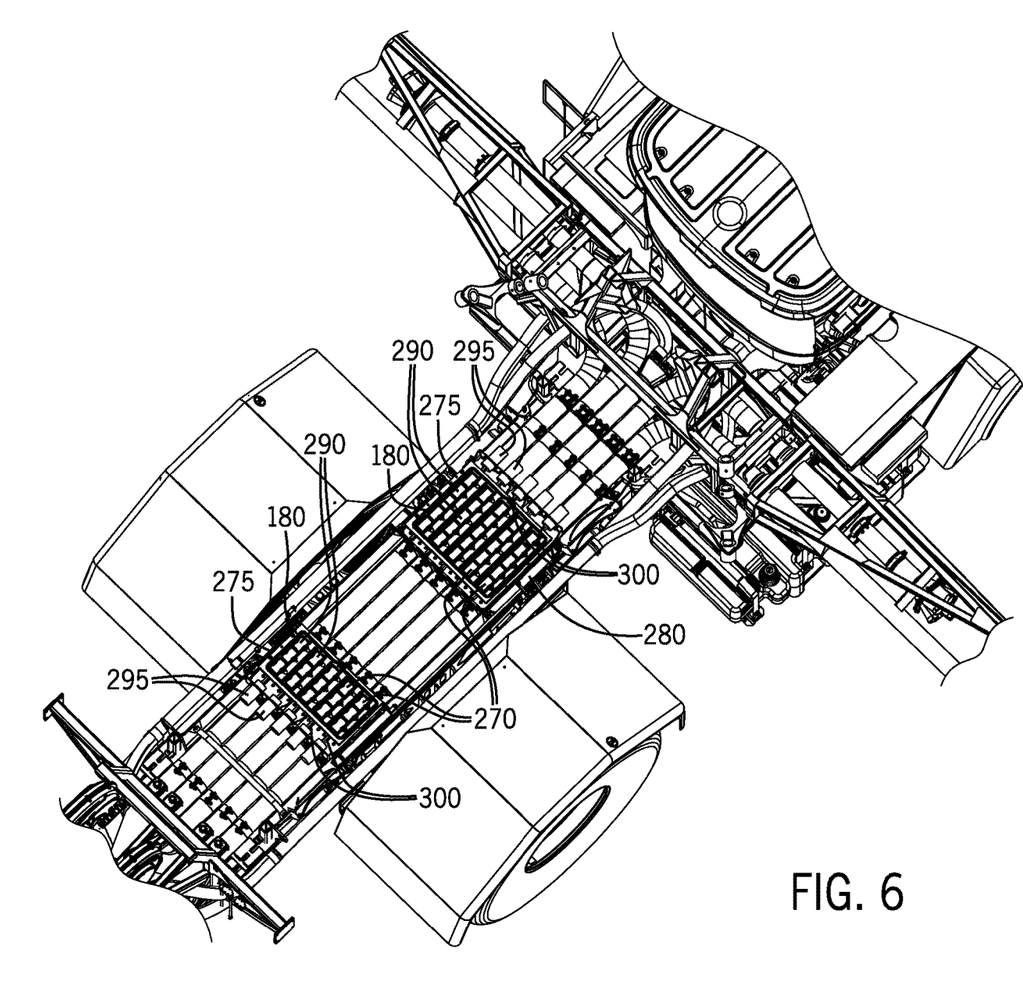
FIG. 6 is a top view of a portion of the agricultural application implement of FIG. 1 with a tank of the implement removed.

Referring now to FIGS. 1, 2, and 6, the particulate contained within each of the compartments 110 and 115 is introduced into the airflow in the delivery lines 120, 125, and 127 via an airtight inline product metering system 180, which are formed of a number of metering devices 270 that function to meter the product flowing from the compartments 110 and 115 into each line.

In the exemplary embodiment of FIG. 6, the metering devices 270 forming the inline metering system 180 are disposed in sets 275 located directly beneath each compartment 110 and 115. Each set 275 of metering devices 270 is associated with one compartment 110 or 115. The metering devices 270 are connected in alignment with apertures 280 formed in the metering system 180 to enable particulate material to enter the metering devices 270 and with openings in the delivery lines 120, 125, and 127 to enable the product to be dispensed from the metering devices 270 into the delivery lines 120, 125, and 127. The number of metering devices 270 forming each set 275 corresponds to the number of delivery lines 120, 125, and 127 in the pneumatic conveying system 25, such that the product from each compartment 110 and 115 can be dispensed into each delivery line utilizing the same set 275 of metering devices 270. Each metering device 270 includes one or more metering wheel(s) 290, a motor 295, a speed sensor or encoder 297 (FIG. 9), and a shaft 300 connecting each metering wheel 290 to its respective motor 295. The motor 295 can be an electric or hydraulic motor that operates to rotate the shaft and the metering wheel 290 at a desired speed to meter the flow of the particulate material through the metering device 270 into the delivery lines 120, 125, and 127. The speed sensor/encoder 297 provides closed-loop feedback to the product rate controller (discussed below) modulating the speed of respective motor 295 via the PWM control valve. Further discussion regarding exemplary metering systems and metering devices can be found in US Patent Application Publication No. 2019/0021215 A1, the content of which is incorporated herein by reference.

Figure 7:
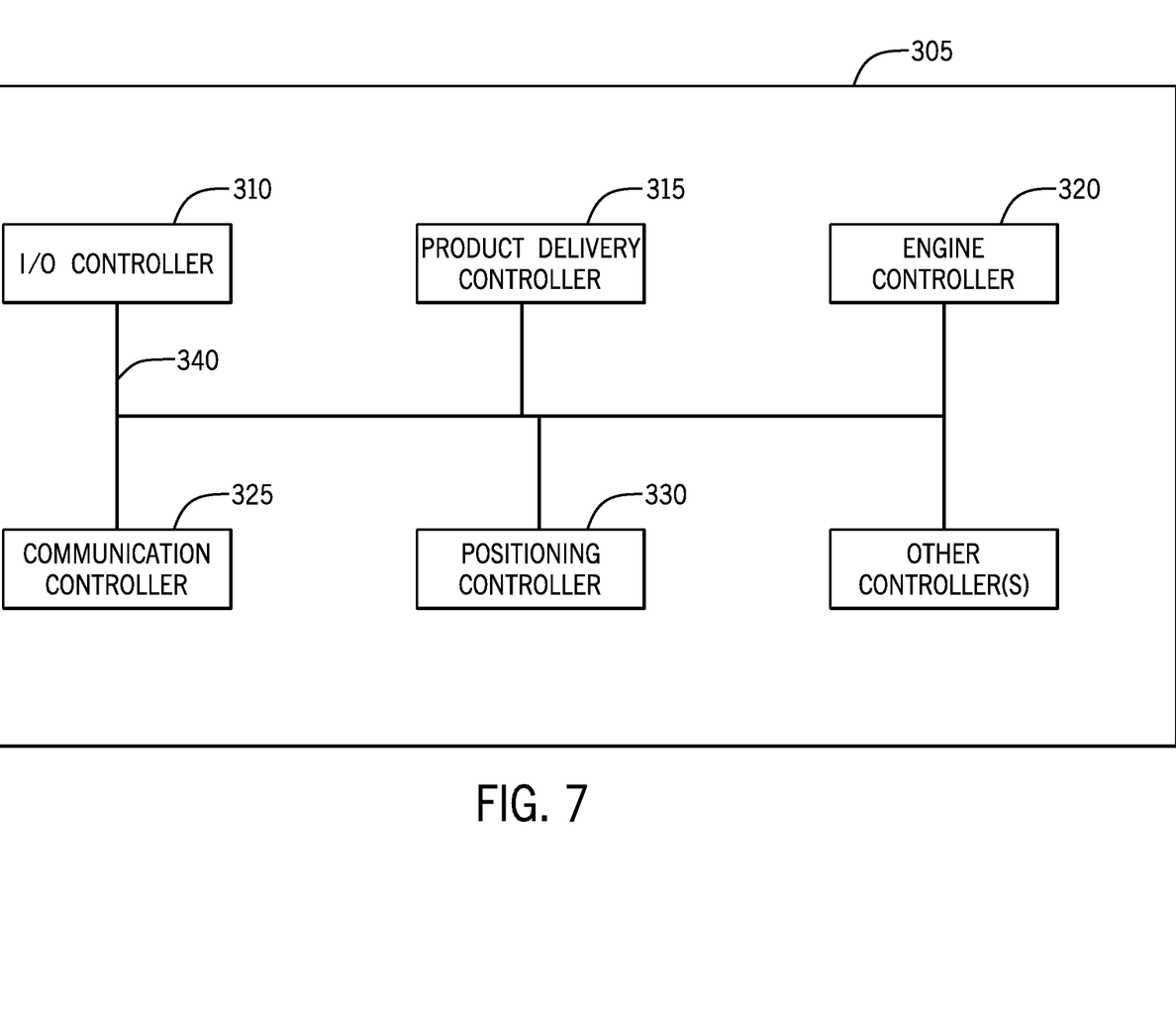
FIG. 7 is a block diagram representing an implement control system for the agricultural application implement of FIG. 1.

FIG. 7 shows a portion of an implement control system 305 capable of being used in the implement 10. The implement control system 305 includes a plurality of processor based control modules (also referred to as control units or controllers), each of which controls an aspect of the implement 10. Exemplary controllers include an input/output (I/O) controller 310, product delivery controller 315, engine controller 320, communication controller 325, and positioning controller 330. Other controllers known in the art may be included with the implement. Other example controllers include a transmission controller, brake controller, vehicle monitoring, climate control controller, and status controller, etc. The controllers are coupled together via a communication bus 340. Example functions performed by each controller include the following: the input/output (I/O) controller 310 provides outputs to and receives inputs from the operator; the product delivery controller 315 controls the delivery of product to and through the pneumatic conveying system; the engine controller 320 monitors and controls the engine, the communication controller 325 transmits and receives communication from and to the agricultural implement, and the positioning controller 330 receives and/or determines position information for the agricultural implement. The product delivery controller 315 is discussed in more detail herein. The other controllers referred to herein can be conventional controllers as is known in the art.

Figure 8:
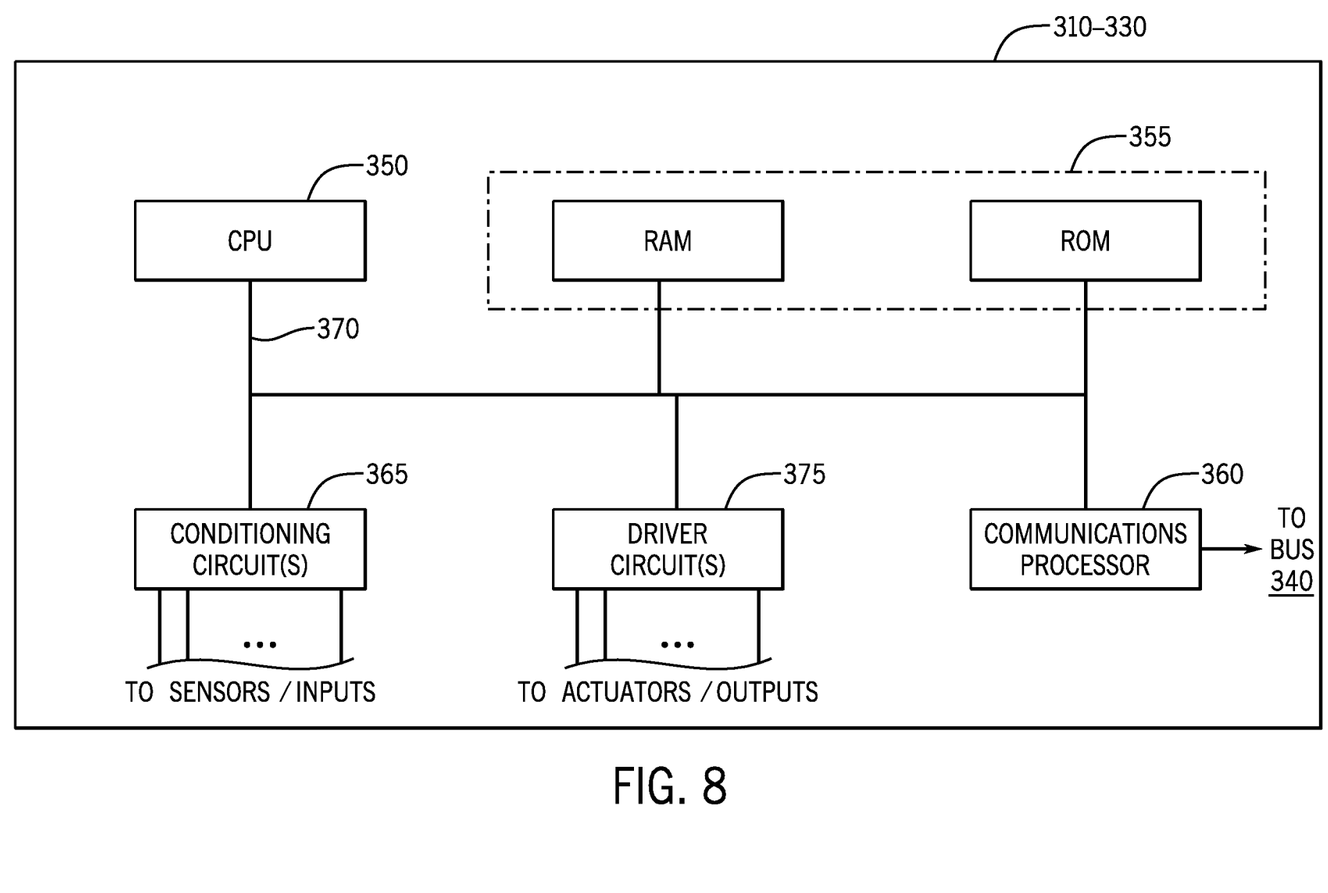
FIG. 8 is a block diagram representing an exemplary controller of those shown in FIG. 7.

FIG. 8 illustrates an exemplary controller of those shown in FIG. 7. Each controller 310-330 includes a processor 350 and memory 355, as well as a communications processor 360 configured to handle all communications over bus 340 with the other controllers 310-330 on the bus 340.

Each controller 310-330 also includes a conditioning circuit 365 that interfaces sensor signals and/or other input (e.g., external communication) to bus 370. Conditioning circuit 365 filters and buffers the signals to eliminate noise, and may include sample-and-bold sub-circuits as well as analog-to-digital converters for processing analog sensor signals.

In addition, each controller 310-330 includes a driver circuit 375 that controls the application of power to actuators and/or other output (e.g., external communication). The processor 350, memory 355, conditioning circuit 365, driver circuit 375, and communications processor are all coupled together by control/data/address bus 370 within each controller 310-330.

The memory 355 can include a RAM and a ROM. The RAM is used to store working variables required by the processor 350. The ROM contains programmed instructions that control the operation of the processor 350. It is envisioned that one or more elements (e.g., the processor 350 and the memory 355) can be combined as is well known in the art.

An improved implement control system 305, including the product delivery controller 315, allows for greater control of product to the mid-implement booms 30 and 35 and offset boom 80. The shown construction has five product metering devices 270, allowing for improved section control. One advantage of mid-implement mounted booms 30 and 35 is that, because booms 30 and 35 are mounted between the front and rear axles 50 and 55 of the implement 10, the stability of the booms 30 and 35 is significantly improved, resulting in a more consistent application. The advantages include improved delivery control, improved loss of product, and decrease of waste.

When apertures 280 are open and the metering wheels 290 are rotating, gravity allows the product to go through the metering wheels 290 and drop into the airflow of the pneumatic conveying system 25. Control of the motors 295 of the metering wheels 290, the motors of the blowers 170 and 175, and pressure control valves (discussed below), are used for delivering product into and through the delivery lines 120, 125, and 127. The five metering devices 270 in each set 275 correspond to five boom sections, and the product delivery controller 315 can deactivate a particular line if overlap is going to occur. For example, the product delivery controller 315 can stop the motor 295 from rotating the metering wheel 290 associated with the line to be deactivated, and can close a pressure valve associated with the line to be deactivated.

With respect to the product delivery controller 315, the conditioning circuit(s) 365 can receive sensor/inputs from meter speed sensors, fan speed sensors, meter pump pressure sensor, fan pump pressure sensor, aperture 280 actuator position, and distributor motor speed sensors. The driver circuit(s) 375 can drive or control fan speed control, air pressure control, meter speed control, meter pump output pressure control, fan pump output pressure control, aperture 280 position control, and distributor motor speed control (if present). The communications processor 360 can communicate with other controllers 310 and 320-330 to receive and transmit communication from/to the operator (e.g., via the I/O controller 310), location information (e.g., Global Positioning System (GPS) information) from the positioning controller 330, and implement speed (e.g., from the I/O controller 310). Other inputs, outputs, and communication are possible depending on the operation of the product delivery controller 315. Further, while the product delivery controller 315 is described herein as a distinct controller, the controls, functions, and operations can be incorporated in other controllers.

Figure 9:
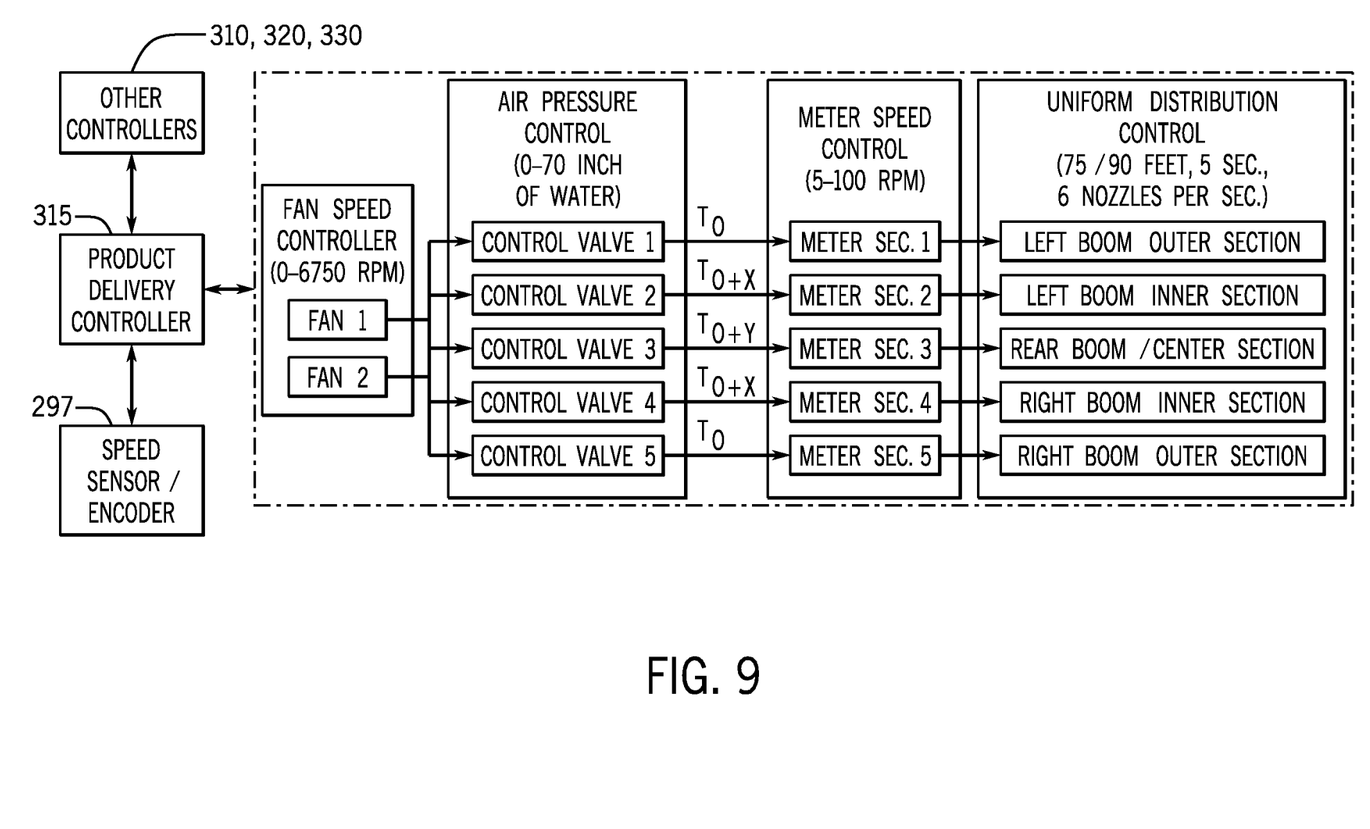
FIG. 9 is a representation of an overlap control for the agricultural application implement of FIG. 1.
Figure 10:
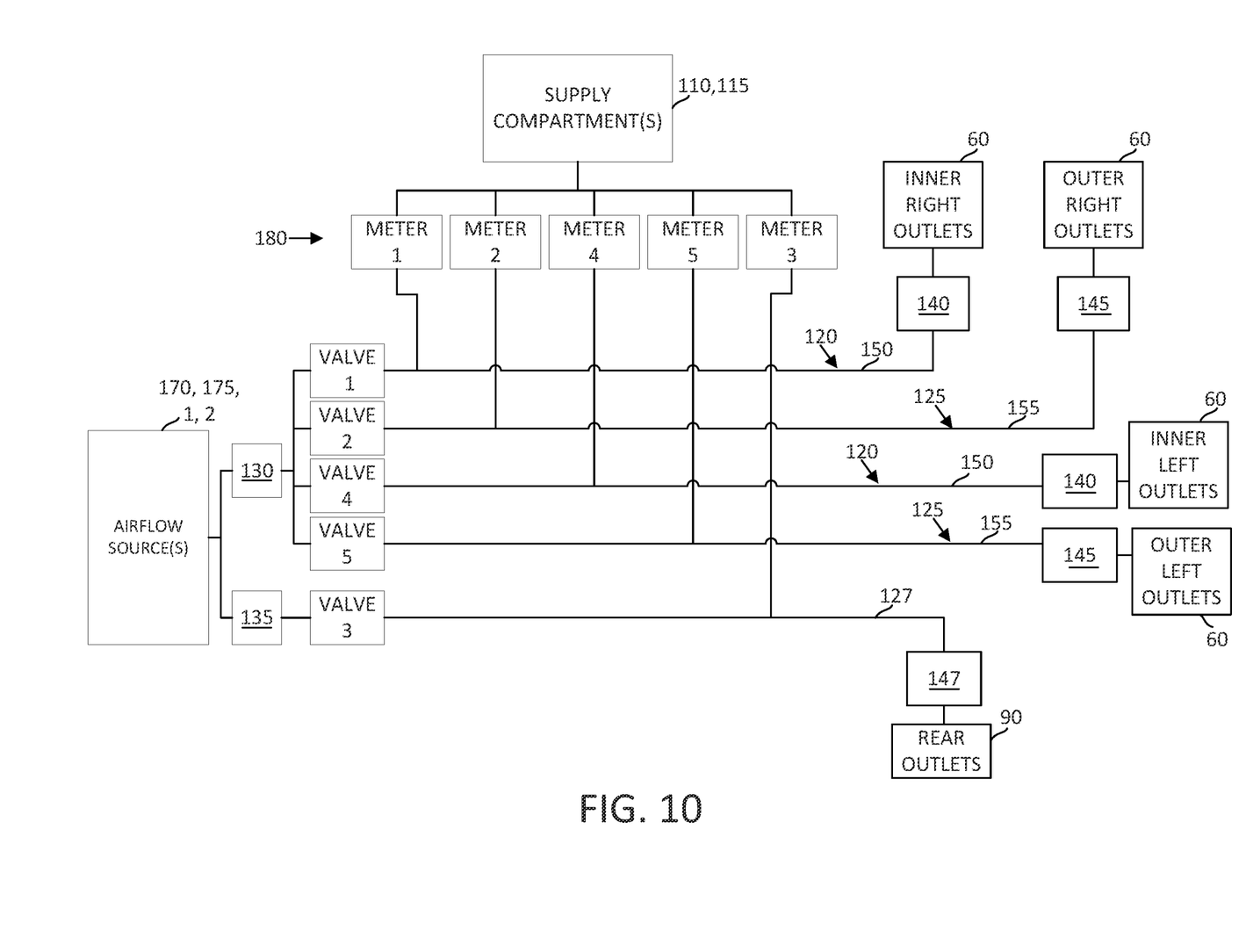
FIG. 10 is a representation of a valve arrangement for the agricultural application implement controlled by the overlap control of FIG. 9.

An example operation of overlap control for the implement 10 is represented in FIG. 9. Additionally, a valve arrangement for the implement 10 controlled by the overlap control of FIG. 9 is shown in FIG. 10. The product delivery controller 340 communicates with the other controllers 310 and 320-330. The communication can include one or more controllers 310 and 320-330 requesting the product deliver controller 340 to activate/deactivate a boom section. FIG. 9 represents the activation of all five boom sections such that the implement 10 provides a linear distribution of product.

First, the product deliver controller 340 activates two fans 1, 2—this provides a start of an airflow. The control of the fans can be constant or variable. In one implementation, the fans' speed are variable and the revolutions-per-minute (RPM) of the fans 1-2 can be controlled between zero and a maximum (e.g., 6750) RPM.

Next, the product deliver controller 340 controls five air pressure control valves 1-5. The air pressure control valves 1-5 determine whether the air flow is present within a particular delivery line. The control of the air pressure control valves 1-5 can be constant or variable. In one implementation, the air pressures are variable and can be between zero and a maximum (e.g., 70 inches of water) pressure.

Then, the product deliver controller 340 controls five metering motors 1-5 associated with respective metering devices. The metering motors 1-5 determine whether product enters the airstream of a delivery line. Further, with variable speed control of the metering motors 1-5, the metering motors 1-5 determine the rate of product being delivered into the airstream of the delivery line. The control of the metering motors 1-5 can be constant or variable. In one implementation, the rotation of the metering motors 1-5 is variable and can be between minimum and maximum RPMs (e.g., between 5-100 RPM).

To provide a linear distribution control, the control of the metering motors 1-5, and consequently the metering wheels and metering devices, occur over multiple time periods. In the operation shown, the outer boom sections (i.e., application section 1 & 5) start at time $T_0$, and is based on when the implement 10 desires to deliver product to the field. The inner boom sections (i.e., application section 2 & 4) start at a time of X seconds delay to offset the difference in lengths between the outer and inner booms. The offset boom section (i.e., application section 3) starts at a time of Y seconds delay to offset the difference between the difference in lengths between the outer and center booms. Each meter and air pressure control valve can be switched ON/Off independent of each other in order to achieve desired overlap control. A similar methodology can be used to end distribution in a linear spread.

Various relations can be used to determine the desired fan speed control, air pressure control, motor speed control, and time delays. Some of the parameters and various relations are listed below.

Application rate (e.g., lb/ac) can be a constant, user input,

Meter speed can be based on product density, meter size, number of sections and spreader constant (calibration factor).

Instantaneous application rate (e.g., lb/min) can be a continuously variable parameter that is a function of application rate, meter speed, vehicle speed and boom width.

Fan speed can be determined by the amount of air pressure required for a current instantaneous application rate.

An amount of time taken by product to travel from metering devices to boom nozzles can be dependent on instantaneous application rate and fan speed.

The inner section boom takes lesser time compare to the outer section boom.

Testing data can be used to provide exact time product takes to reach from the metering devices to nozzles for each section.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. A method of the delivering of particulate product by an agricultural product delivery applicator, the applicator comprising a primary boom arm having a first application section, the applicator further comprising a secondary boom arm having a second application section, the secondary boom arm being offset from the primary boom arm in a front-rear direction of the applicator, the method comprising:

activating an airflow source to provide an airflow of a pneumatic conveying system;

controlling a first air pressure control valve to allow the airflow through a first delivery line operably coupled to the airflow source, the first delivery line including a first plurality of outlets supported at the first application section;

controlling a second air pressure control valve to allow the airflow through a second delivery line operably coupled to the airflow source, the second delivery line including a second plurality of outlets supported at the second application section;

controlling a first metering device associated with the first delivery line at a first time to provide product to the first delivery line resulting in a first mixed flow of airflow and product; and controlling a second metering device associated with the second delivery line at a second time to provide product to the first delivery line resulting in a second mixed flow of airflow and product, the second time being after the first time.

2. The method of claim 1, wherein the airflow source is a variable airflow source, wherein the first air pressure control valve is a first variable air pressure control valve, and wherein the first metering device is a first variable metering device.

3. The method of claim 1, wherein the first metering device includes a first metering wheel and a first motor operating the first metering wheel, and wherein the controlling a first metering device includes controlling the first motor to operate the first metering wheel at a rotational speed.

4. The method of claim 1, wherein the primary boom arm has a further application section,
wherein the pneumatic conveying system comprises a further delivery line, the further delivery line being operably connected to the airflow source and to the supply compartment, the further delivery line including a further plurality of outlets supported at the further application section,
wherein the metering system comprises a further metering device associated with the further delivery line,
the method further comprising controlling the further metering device at a third time to provide product to the third delivery line resulting in a third mixed flow of airflow and product, the second time being after the third time.

5. The method of claim 4, wherein the third time is determined with respect to the first time based at least in part on a difference in lengths between the first application section and the further application section.

6. The method of claim 1, wherein the second time is determined with respect to the first time based at least in part on a distance of the offset between the first boom section and the second boom section in the front-rear direction.

7. The method of claim 1, wherein the applicator further comprises a third boom arm having a third application section, the method further comprising:
controlling a third air pressure control valve to allow the airflow through a third delivery line operably coupled to the airflow source, the third delivery line including a third plurality of outlets supported at the third application section; and
controlling a third metering device associated with the third delivery line at a third time to provide product to the third delivery line resulting in a first mixed flow of airflow and product, the third time being after the second time.

8. The method of claim 7, wherein the third boom arm and the second boom arm are offset in the front-rear direction of the applicator.

9. A method of the delivering of particulate product by an agricultural product delivery applicator, the applicator comprising a primary boom arm having a first application section, the applicator further comprising a secondary boom arm having a second application section, the secondary boom arm being offset from the primary boom arm in a front-rear direction of the applicator, the method comprising:
activating an airflow source to provide an airflow of a pneumatic conveying system;
controlling a first air pressure control valve to allow the airflow through a first delivery line operably coupled to the airflow source, the first delivery line including a first plurality of outlets supported at the first application section;
controlling a second air pressure control valve to allow the airflow through a second delivery line operably coupled to the airflow source, the second delivery line including a second plurality of outlets supported at the second application section;
controlling a first metering device associated with the first delivery line at a first time to provide product to the first delivery line resulting in a first mixed flow of airflow and product;
controlling a second metering device associated with the second delivery line at a second time to provide product to the first delivery line resulting in a second mixed flow of airflow and product, the second time being after the first time;
controlling a third air pressure control valve to allow an airflow through a third delivery line operably coupled to the airflow source; and
controlling a third metering device associated with the third delivery line at a third time to provide product to the third delivery line resulting in a first mixed flow of airflow and product, the third time being after the second time.

10. The method of claim 9, wherein the applicator further includes a third boom arm having a third application section,
wherein the third delivery line includes a third plurality of outlets supported at the third application section,
wherein the first delivery line provides the first mixed flow of airflow and product to the first application section, wherein the second delivery line provides the second mixed flow of airflow and product to the second application section, and wherein the third delivery line provides the third mixed flow of airflow and product to the third application section.

11. The method of claim 1, wherein the secondary boom arm is rearward of the primary boom arm in the front-rear direction of the applicator.

12. The method of claim 9, wherein the primary boom arm includes a further application section,
wherein the third delivery line includes a third plurality of outlets supported at the further application section,
wherein the first delivery line provides the first mixed flow of airflow and product to the first application section, wherein the second delivery line provides the second mixed flow of airflow and product to the second application section, and wherein the third delivery line provides the third mixed flow of airflow and product to the further application section.

* * * * *